United States Patent Office 2,964,510
Patented Dec. 13, 1960

2,964,510

BUTENE-1 POLYMERIZATION

Charles W. Seelbach, Cranford, and Lawrence T. Eby, Linden, N.J., assignors to Esso Research and Engineering Company, a corporation of Delaware No Drawing. Filed Apr. 9, 1956, Ser. No. 576,773

1 Claim. (Cl. 260—93.7)

This invention relates to an improved process for polymerization of butene-1 and to novel products resulting therefrom.

Broadly, the invention relates to the polymerization of butene-1 with a special type of catalyst which is a complex or reaction product of an alkyl metal compound, such as diethyl aluminum chloride or aluminum sesquichloride (an equal molar mixture of aluminum diethyl chloride and aluminum ethyl dichloride) with a compound of titanium, e.g. $TiCl_4$.

The temperature to be used in carrying out this polymerization should be about 25 to 85° C., and the pressure may be between 1 and 100 atmospheres, preferably about 800 lbs. sq. in. gauge. It is is preferable to carry out the polymerization in the presence of a substantial amount of liquid diluent, which may be an inert aliphatic hydrocarbon, preferably having about 6 to 20 carbon atoms, e.g. hexane, heptane, refined kerosene, refined gas oil, etc. or various aromatic hydrocarbons such as benzene, toluene, etc. or other inert solvents.

Although any desired method of contacting the butene with the catalyst may be used, a preferred method is to pass the olefin as a gas or vapor, or even as a liquid, into the catalyst slurry, with good agitation. Polymerization occurs, and continues at a rate which varies somewhat according to the nature of the polymerization feed, the catalyst, and relative concentration of both the feed and catalyst in respect to the amount of diluent present.

When polymerization has proceeded to the desired extent, the feed is stopped, and the polymerization reactor may be blown with inert gas such as nitrogen, and the polymer is recovered from the reaction mixture by any desired means. As the resulting polymer is generally of quite high molecular weight, e.g. above 1,000 and generally above 10,000 (by Harris method, J. Pol. Sci., v. 8, p. 361; 1952), it is frequently present in the reaction mixture in the form of insoluble polymer particles suspended as a slurry in the diluent; it may be filtered, washed, or otherwise separated, and the polymer may be washed and agitated with a suitable catalyst deactivator such as an alcohol, e.g. isopropanol or butanol, and finally dried, with or without a water washing step.

In cases in which part or all of the polymer remains dissolved in the inert diluent or solvent, the reaction liquid may be washed, preferably countercurrently, with alcohol, or other suitable means of deactivating and removing catalyst, and finally the volatile hydrocarbon solution of the polymer may then be marketed as such, or evaporated to leave a dry polymer.

The resulting polymer product may vary in physical texture from a high molecular weight oily liquid to rubbery and resinous solid polymers. These may be sheeted into thin self-supporting films, or calendered onto cloth, papers and other materials, or made into laminated products. Also, if desired, they may be used as coating composition ingredients, e.g. in the form of a solution in a volatile solvent such as naphtha or toluene, with or without other additives such as anti-oxidants, pigments, plasticizers, etc.

In preparing the catalyst, the preferred procedure is to make a solution of the desired alkyl metal compound, in a suitable inert solvent such as n-heptane, and make a separate solution of $TiCl_4$, also in inert solvent such as n-heptane, and then mix the two solutions in the desired proportions, e.g. at room temperature. The mixture of these two catalyst components generally causes the formation of a precipitate which is desirably kept in suspension by agitation.

It has been found that the mol ratio of the aluminum compound to the titanium compound in the catalyst mixture is particularly critical for the purposes of the present invention; i.e. it is possible at only a certain critical ratio of aluminum to titanium to obtain high yields of polymer based on the amount of catalyst employed. In accordance with the invention, therefore, it is necessary that the molar ratio of aluminum to titanium in the catalyst be 6:1. It has also been found that if solid high molecular weight insoluble polymer is desired, the diethyl aluminum chloride must be used, while if soluble or oily polymer is desired then the sesquichloride (equal molecular mixture of diethyl aluminum chloride and ethyl aluminum dichloride) must be used.

The details and advantages of the invention will be better understood from a consideration of the following experimental data.

*Example I*

Twenty ml. of 0.876 M triethyl aluminum and 3.4 ml. of 0.843 M $TiCl_4$ in dry n-heptane were placed in a 50 ml. graduate, made up to 50 ml. with n-heptane, shaken and allowed to stand for one hour in a nitrogen dry box. These quantities represented an Al/Ti ratio of 6/1. The catalyst was then placed in a 1.8 liter stainless steel bomb and was rinsed in with 10 ml. of n-heptane. The bomb was placed in a rocker and attached to feed lines and temperature control equipment.

264 grams of 1-butene were charged to a reservoir bomb which was cooled with a Dry Ice-isopropanol mixture.

The rocker was started and the 1-butene charge fed to the reactor in one slug with 400# of $N_2$. The reactor was heated to 75–80° C. and maintained a pressure of 800 lbs./sq. in. gauge for 40 hours.

After 40 hours the off gas was measured, the bomb opened and the polymer treated with isopropanol to solubilize as much catalyst as possible. After refluxing in isopropanol overnight the polymer was filtered and dried in vacuo. The filtrate was evaporated and any resultant polymer residue dried in vacuo.

These conditions yielded 5.6 g. of solid polymer with an intrinsic viscosity of 2.2 and 0.4 g. of a grease-like material recovered from the isopropanol filtrate.

*Example II*

Using the same technique and proportions as in Example I a duplicate run yielded 13.3 grams of solid polymer with an intrinsic viscosity of 1.27 and less than a gram of grease-like material.

*Example III*

Using the same technique and proportions as in Example I, diethyl aluminum chloride gave a 46 gram yield of solid polymer and 10.5 gram yield of grease-like material recovered from the isopropanol filtrate.

*Example IV*

Using the same technique and proportions as in Example I, aluminum sesquichloride (49% diethyl aluminum chloride–51% ethyl aluminum dichloride) gave 189.7 grams of a medium viscosity oil. The catalyst was removed by treatment with aqueous HCl.

These results are summarized in the following table.

| Exp. | Catalyst | Catalyst Efficiency | | | Intrins. Vis. Solid |
|---|---|---|---|---|---|
| | | Total | Soluble | Solid | |
| 1 | Et$_3$Al | 3 | 0.4 | 3 | 2.21 |
| 2 | Et$_3$Al | 6 | 1.0 | 6 | 1.27 |
| 3 | Et$_2$AlCl | 27 | 5 | [1] 22 | 0.71 |
| 4 | Sesquichloride | 75 | 75 | 0 | |

[1] S.P./M.P.=95°/107° C., density=0.873, low melt viscosity, soluble in heptane, partially crystalline.

The above data show that for the production of solid polymer the catalyst efficiency is four to seven times greater with diethyl aluminum chloride than with aluminum triethyl at an Al/Ti ratio of 6:1. For the production of liquid or soluble polymer, the sesquichloride is unique in forming no solid polymer.

*Example V*

20 ml. of 0.876 M Et$_3$Al in dry white oil and 3 ml. of 0.843 M TiCl$_4$ were added to 100 ml. of white oil in a 250 ml. separatory funnel, made up to 250 ml. with white oil, shaken, allowed to stand at room temperature for one hour. The catalyst was placed in the 2-liter glass reactor, brought to 50° C. and 1-butene bubbled into the reaction mixture at atmospheric pressure. Olefin absorption started and reached a maximum rate of 650 ml./min. in 21 minutes. The absorption rate then decreased to zero in an additional 8 minutes. The reaction mixture was gradually heated to 120.8° C. over a period of 110 minutes, but no additional 1-butene absorption was observed. The reaction mixture was cooled to 62° C. and 50 ml. of isopropanol added to deactivate and solubilize the catalyst. One gram of solid polymer and 1.2 grams of soluble polymer were isolated. The soluble polymer had a cryoscopic molecular weight of 482, an unsaturation equivalent to 71 centigrams of iodine per gram, a kinematic viscosity of 98.9 at 100° F. and of 9.7 at 210° F. Infra-red analysis indicated type II, cis and trans and type III unsaturation with considerable short-chain branching such as ethyl groups, etc. and some longer chain branching.

This example shows that polymer can be obtained at atmospheric pressure but that the yields are less than at 800 lbs.

The nature of the present invention having been thus fully set forth and specific examples of the same given, what is claimed as new and useful and desired to be secured by Letters Patent is:

A process for preparing solid resinous polymer of butene-1 having a molecular weight above 10,000 which comprises polymerizing butene-1 at a temperature of about 75° to 80° C. and a pressure of about 800 lbs./sq. in. gauge by passing it into an agitated catalyst slurry prepared by mixing a solution of aluminum diethyl chloride in n-heptane with a solution of titanium tetrachloride in n-heptane, the two heptane solutions being mixed at room temperature in a proportion corresponding to a molar ratio of aluminum-to-titanium of 6-to-1, and recovering solid polymer from the resulting reaction mixture.

References Cited in the file of this patent

UNITED STATES PATENTS

| | | |
|---|---|---|
| 2,439,528 | Roedel | Apr. 13, 1948 |
| 2,440,498 | Young et al. | Apr. 27, 1948 |
| 2,593,417 | D'Alelio | Apr. 22, 1952 |
| 2,721,189 | Anderson et al. | Oct. 18, 1955 |
| 2,824,090 | Edwards et al. | Feb. 18, 1958 |
| 2,838,477 | Roelen et al. | June 10, 1958 |
| 2,862,917 | Anderson et al. | Dec. 2, 1958 |
| 2,885,389 | Schappert | May 5, 1959 |

FOREIGN PATENTS

| | | |
|---|---|---|
| 534,792 | Belgium | Apr. 30, 1955 |
| 526,101 | Italy | May 14, 1955 |
| 540,459 | Belgium | Aug. 31, 1955 |
| 538,782 | Belgium | Dec. 6, 1955 |

OTHER REFERENCES

"Linear and Stereoregular Addition Polymers" (Gaylord et al.), Interscience Publishers Inc., N.Y. (1959).